(12) United States Patent
Byrne et al.

(10) Patent No.: US 8,684,652 B2
(45) Date of Patent: Apr. 1, 2014

(54) APPARATUS AND METHOD FOR LOADING AND UNLOADING CONTAINERS

(75) Inventors: Brian Byrne, Valley Cottage, NY (US); Douglas McLeester, Flemington, NJ (US)

(73) Assignee: Sanofi-Aventis U.S. LLC, Bridgewater, NJ (US)

( * ) Notice: Subject to any disclaimer, the term of this patent is extended or adjusted under 35 U.S.C. 154(b) by 326 days.

(21) Appl. No.: 13/104,496

(22) Filed: May 10, 2011

(65) Prior Publication Data
US 2012/0090957 A1    Apr. 19, 2012

Related U.S. Application Data

(60) Provisional application No. 61/393,601, filed on Oct. 15, 2010.

(51) Int. Cl.
*B65G 57/112* (2006.01)
*B65G 67/20* (2006.01)

(52) U.S. Cl.
USPC ............ 414/398; 198/511; 198/589; 198/592

(58) Field of Classification Search
USPC .......... 198/511, 589, 592, 598, 601; 414/389, 414/391, 398, 399, 400, 798.7
See application file for complete search history.

(56) References Cited

U.S. PATENT DOCUMENTS

| | | | |
|---|---|---|---|
| 3,885,682 A | 5/1975 | McWilliams | |
| 3,966,068 A | 6/1976 | Duvia | |
| 3,982,338 A | 9/1976 | Dick et al. | |
| 4,027,759 A | 6/1977 | Van Deberg | |
| 4,028,864 A | 6/1977 | Bell | |
| 4,057,010 A | 11/1977 | Smith | |
| 4,067,694 A | 1/1978 | Blakely et al. | |
| 4,124,129 A | 11/1978 | Barrt | |
| 4,129,229 A * | 12/1978 | Brown | 221/129 |
| 4,162,018 A | 7/1979 | Arya | |
| 4,182,386 A | 1/1980 | Alack | |
| 4,279,555 A | 7/1981 | Rydell | |
| 4,321,004 A | 3/1982 | Mills | |
| 4,372,725 A | 2/1983 | Moore et al. | |

(Continued)

FOREIGN PATENT DOCUMENTS

| | | |
|---|---|---|
| DE | 1020205 | 2/1966 |
| EP | 0 999 156 A1 | 10/2000 |
| FR | 2 789 666 | 8/2000 |

OTHER PUBLICATIONS

International Search Report and Written Opinion dated Aug. 29, 2011 for International application No. PCT/US2011/035889.

*Primary Examiner* — Douglas Hess
(74) *Attorney, Agent, or Firm* — Scully, Scott, Murphy & Presser, P.C.

(57) ABSTRACT

An apparatus for loading and unloading a plurality of shipping containers into a carrier. The containers are arranged according to a predetermined pattern on a fixed staging unit of the apparatus. A first conveyor of the apparatus receives and transports the arranged containers from the fixed staging unit. The first conveyor is movable horizontally. A second conveyor of the apparatus receives the containers from the first conveyor and transports the containers into the carrier. The second conveyor is movable horizontally and vertically. A control unit of the apparatus controls transportation of the containers from the second conveyor into the carrier when the second conveyor is vertically moved to a predetermined position.

19 Claims, 7 Drawing Sheets

(56) References Cited

U.S. PATENT DOCUMENTS

| | | | | |
|---|---|---|---|---|
| 4,383,598 A | | 5/1983 | Newman | |
| 4,386,490 A | | 6/1983 | Griffith et al. | |
| 4,394,104 A | | 7/1983 | Camerini et al. | |
| 4,475,644 A | | 10/1984 | Raippo | |
| 4,527,685 A | | 7/1985 | Welder | |
| 4,704,063 A | | 11/1987 | Updike, Jr. et al. | |
| 4,726,726 A | | 2/1988 | Dossena et al. | |
| 4,732,522 A | | 3/1988 | Pencé | |
| 4,737,063 A | | 4/1988 | van den Pol | |
| 4,746,059 A | | 5/1988 | Jackson | |
| 4,802,811 A | | 2/1989 | Nijenhuis | |
| 4,813,526 A | * | 3/1989 | Belanger | 198/313 |
| 4,832,172 A | | 5/1989 | Roberto | |
| 4,842,471 A | | 6/1989 | Hodgetts | |
| 4,844,234 A | | 7/1989 | Born et al. | |
| 4,860,882 A | | 8/1989 | Maeda et al. | |
| 4,917,559 A | | 4/1990 | van der Schoot | |
| 4,946,027 A | | 8/1990 | Jenkins | |
| 4,984,962 A | | 1/1991 | Järvinen | |
| 5,099,634 A | * | 3/1992 | Treloar | 53/475 |
| 5,129,778 A | | 7/1992 | Harp | |
| 5,203,668 A | | 4/1993 | Marmur | |
| 5,269,642 A | | 12/1993 | Zoromski | |
| 5,325,953 A | | 7/1994 | Doster et al. | |
| 5,339,613 A | | 8/1994 | Wymore | |
| 5,374,151 A | | 12/1994 | Matthews | |
| 5,421,687 A | | 6/1995 | Wayman | |
| 5,431,285 A | | 7/1995 | Harbour | |
| 5,443,350 A | | 8/1995 | Wilson | |
| 5,685,416 A | * | 11/1997 | Bonnet | 198/812 |
| 5,697,753 A | * | 12/1997 | Aurora et al. | 414/398 |
| 5,746,572 A | | 5/1998 | Winski | |
| 5,807,055 A | | 9/1998 | van de Hazel | |
| 5,829,947 A | | 11/1998 | Litten | |
| 5,895,191 A | | 4/1999 | Bonora et al. | |
| 5,913,655 A | * | 6/1999 | Maday | 414/797.2 |
| 6,068,435 A | | 5/2000 | Börjesson | |
| 6,227,377 B1 | * | 5/2001 | Bonnet | 209/650 |
| 6,397,999 B1 | * | 6/2002 | Taylor | 193/35 TE |
| 6,406,247 B1 | | 6/2002 | Ghiretti et al. | |
| 6,431,346 B1 | | 8/2002 | Gilmore et al. | |
| 6,450,753 B1 | | 9/2002 | Hallstrom et al. | |
| 6,503,043 B1 | * | 1/2003 | Smith et al. | 414/331.14 |
| 6,537,015 B2 | | 3/2003 | Lim et al. | |
| 6,543,601 B2 | | 4/2003 | Luevano | |
| 6,547,511 B1 | | 4/2003 | Adams | |
| 6,725,999 B2 | * | 4/2004 | Luevano | 198/361 |
| 6,931,314 B2 | | 8/2005 | Holland et al. | |
| 7,035,856 B1 | | 4/2006 | Morimoto | |
| 7,074,004 B2 | | 7/2006 | Lockamy et al. | |
| 7,108,125 B2 | | 9/2006 | Gilmore et al. | |
| 7,241,100 B2 | | 7/2007 | Lockamy et al. | |
| 7,264,437 B2 | | 9/2007 | Lockamy et al. | |
| 7,270,511 B2 | | 9/2007 | Lockamy et al. | |
| 7,357,242 B2 | | 4/2008 | Enomoto | |
| 7,370,753 B2 | * | 5/2008 | Yang et al. | 198/812 |
| 7,410,339 B2 | | 8/2008 | Franzen et al. | |
| 7,661,522 B2 | | 2/2010 | Hausladen | |
| 7,695,234 B2 | | 4/2010 | Yamashita | |
| 7,695,235 B1 | | 4/2010 | Rallis | |
| 8,079,457 B2 | * | 12/2011 | Heinz | 198/435 |

\* cited by examiner

APPARATUS AND METHOD FOR LOADING AND UNLOADING CONTAINERS

CROSS REFERENCE TO RELATED APPLICATION

This application is relates to and claims the benefit of U.S. Provisional Patent Application Ser. No. 61/393,601 filed Oct. 15, 2010, the entire contents of which is incorporated by reference herein.

BACKGROUND OF THE INVENTION

The present disclosure relates generally to a container loading and unloading apparatus, and more particularly to an apparatus and method for loading and unloading containers with respect to a carrier in a controlled manner, involving minimum human intervention.

Containers, particularly road-transportable shipping containers, are commonly used to ship and store cargo. Typically, the containers are loaded into and unloaded from a carrier, such as a shipping trailer, for transportation of the cargo. During the loading process, the container may be handled in an uncontrolled manner, resulting in unorganized arrangement of the containers, which causes waste of the limited space of the shipping trailer and difficulty in locating and unloading the containers. Furthermore, in order to organize the containers, additional human labor and/or equipment may be needed, for example, to place the containers in a stacked manner. Furthermore, the addition of the human element increases the safety and physiological concerns associated with manually lifting and placing shipping cases.

U.S. Pat. No. 6,725,999 to Luevano teaches an unloading system, which includes a loading platform, a conveyor positioned below the loading platform, and a slanted ramp between the loading platform and the conveyor. Items to be unloaded from a carrier can be slid from the platform to the conveyor through the ramp, relying on the gravity of the items. However, since the items are slid on the ramp, it is impossible for the system of Luevano to position a plurality of items in a stacked manner under control. Accordingly, interference of the items during the unloading process is inevitable and additional human labor is necessitated to organize the items.

U.S. Pat. No. 5,829,947 to Litten teaches a hydraulic ramp loader, which includes an extendible ramp and a hydraulic system for moving the ramp up and down with respect to a carrier. The ramp can be moved up and down by the hydraulic system. The ramp, including four panels connected with one another, allows an item to slide on the panels. Thus, similar to Luevano, Litten cannot load or unload a plurality of items in a stacked manner under control. Accordingly, additional human labor is necessitated to organize the items.

Therefore, it is desirable to provide a container loading and unloading apparatus and method, which is capable of loading and unloading the containers in a controlled manner, and minimizing human intervention during the loading and unloading process, thereby reducing human safety and physical concerns.

BRIEF DESCRIPTION OF THE INVENTION

As described herein, the exemplary embodiments of the current invention overcome one or more of the above and other disadvantages known in the art.

An exemplary aspect of the present invention relates to an apparatus for loading and unloading a plurality of items into a carrier. The apparatus includes a fixed staging unit, a first conveyor configured to receive and transport the arranged items from the fixed staging unit, a second conveyor operatively connected to the first conveyor, and a control unit. The plurality of items are arranged according to a predetermined pattern on the fixed staging unit. The first conveyor is movable substantially horizontally. The second conveyor is configured to receive the arranged items from the first conveyor and transport the arranged items into the carrier. The second conveyor is movable substantially horizontally and vertically. The control unit is configured to control transportation of the arranged items from the second conveyor into the carrier when the second conveyor is vertically moved to a predetermined position.

Preferably, the second conveyor includes a first end operatively connected to the first conveyor, a second end movable substantially vertically, and a body connecting the first end and the second end.

Preferably, the second conveyor includes a platform disposed at the second end thereof, for holding and substantially vertically moving the arranged items.

Preferably, the second conveyor includes an arm associated with the platform, for moving the arranged items from the platform into the carrier.

Preferably, the control unit is configured to move the end platform vertically to the predetermined position based on a height of the items.

Preferably, the fixed staging unit includes a middle section and at least a pair of legs connected by the middle section, the middle section defining a hollow space therein. The fixed staging area also acts as a guide controlling the alignment as the conveyor unit moves forward and back during the loading or unloading process.

Preferably, the first conveyor includes a platform section and a frame section, at least a portion of the platform section being received in the hollow space of the middle section of the fixed staging unit.

Preferably, the first conveyor includes a plurality of wheels for assisting the substantially horizontal movement of the first conveyor.

Another exemplary aspect of the present invention relates to a method of loading and unloading a plurality of items into a carrier. The method includes the steps of arranging the plurality of items according to a predetermined pattern, moving the arranged items to a first conveyor, transporting the arranged items from the first conveyor to a second conveyor, moving the first conveyor and the second conveyor substantially horizontally to access a space within the carrier, moving the second conveyor substantially vertically to a predetermined position in the space and moving the arranged items from the second conveyor into the carrier.

Preferably, the step of arranging comprises arranging the plurality of items into a row.

Preferably, the step of moving the second conveyor substantially vertically comprises determining a position in the space based on a height of the items and moving the second conveyor substantially vertically to the position.

Preferably, the steps of moving the first conveyor and the second conveyor substantially horizontally to access a space within the carrier and moving the second conveyor substantially vertically to a predetermined position in the space are performed prior to the step of arranging the plurality of items according to a predetermined pattern.

Still another exemplary aspect of the present invention relates to a method of loading and unloading a plurality of items into a carrier. The method includes the steps of arranging the plurality of items into a first group and a second group according to a predetermined pattern, moving the first group and the second group to a first conveyor, transporting the first group from the first conveyor to a second conveyor, stopping the first conveyor, moving the first conveyor and the second conveyor substantially horizontally to access a space within the carrier, moving the second conveyor substantially vertically to a first predetermined position in the space, moving the first group from the second conveyor into the carrier, restarting the first conveyor to transport the second group from the first conveyor to the second conveyor, moving the second conveyor substantially vertically to a second predetermined position in the space, and moving the second group from the second conveyor into the carrier.

Preferably, the step of arranging the plurality of items into a first group and a second group according to a predetermined pattern comprises arranging the plurality of items into at least a first row and a second row.

Preferably, the step of moving the second conveyor substantially vertically to a second predetermined position in the space comprises determining the second position based on a height of the items and the first predetermined position, and moving the second conveyor substantially vertically to the second position.

Preferably, the method further includes moving the first conveyor and the second conveyor substantially horizontally after transporting the second group from the first conveyor to the second conveyor.

Preferably, the method further includes moving the first conveyor and the second conveyor substantially horizontally after transporting the second group from the second conveyor into the carrier.

Preferably, the steps of moving the first conveyor and the second conveyor substantially horizontally to access a space within the carrier and moving the second conveyor substantially vertically to a first predetermined position in the space are performed prior to the step of arranging the plurality of items into a first group and a second group according to a predetermined pattern. More preferably, the step of moving the second conveyor substantially vertically to a second predetermined position in the space is performed prior to the step of restarting the first conveyor to transport the second group from the first conveyor to the second conveyor.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, the drawings are merely intended to conceptually illustrate the structures and procedures described herein.

DETAILED DESCRIPTION OF THE EXEMPLARY EMBODIMENTS OF THE INVENTION

Figure 1:
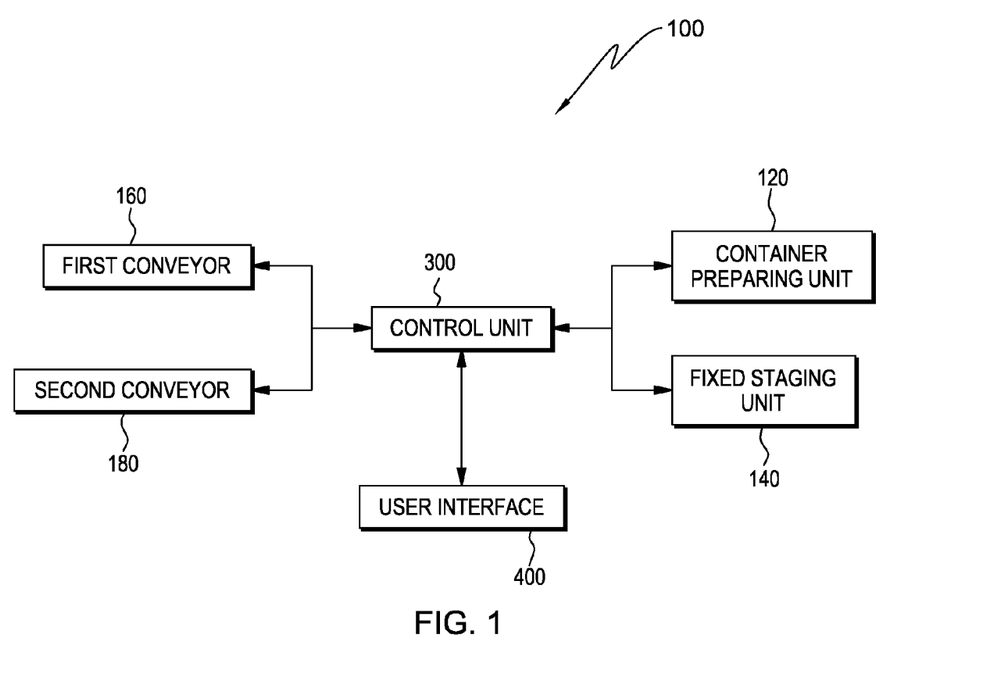
FIG. 1 is a block view of a loading and unloading apparatus according to an exemplary embodiment of an aspect of the present invention, schematically illustrating functional units of the apparatus.

FIG. 1 is a block view schematically illustrating functional units of a loading and unloading apparatus 100 according to an exemplary embodiment of the present invention. The apparatus 100 generally includes a container preparing unit 120, a fixed staging unit 140, a first conveyor 160 capable of moving substantially horizontally, a second conveyor 180 capable of moving substantially horizontally and vertically, and a control unit 300. The first conveyor 160 and the second conveyor 180 load and unload containers with respect to a carrier 200 shown in dash lines in FIG. 2. The carrier 200 includes, but is not limited to, a shipping trailer, for example.

The control unit 300 is configured to communicate with the container preparing unit 120, the fixed staging unit 140, the first conveyor 160 and the second conveyor 180 to send operational instructions to the units. For example, control signals can be transmitted through wired or wireless communication.

During operation of the loading and unloading apparatus 100, a plurality of shipping containers are numbered on the container preparing unit 120 and further arranged according to a predetermined pattern on the fixed staging unit 140. Subsequently, the arranged containers are transported to the first conveyor 160, which in turn transports the containers to the second conveyor 180. The control unit 300 is configured to control transportation of the arranged items from the second conveyor 180 into the carrier 200, after the containers are vertically moved by the second conveyor 180 to a predetermined position.

Figure 2:
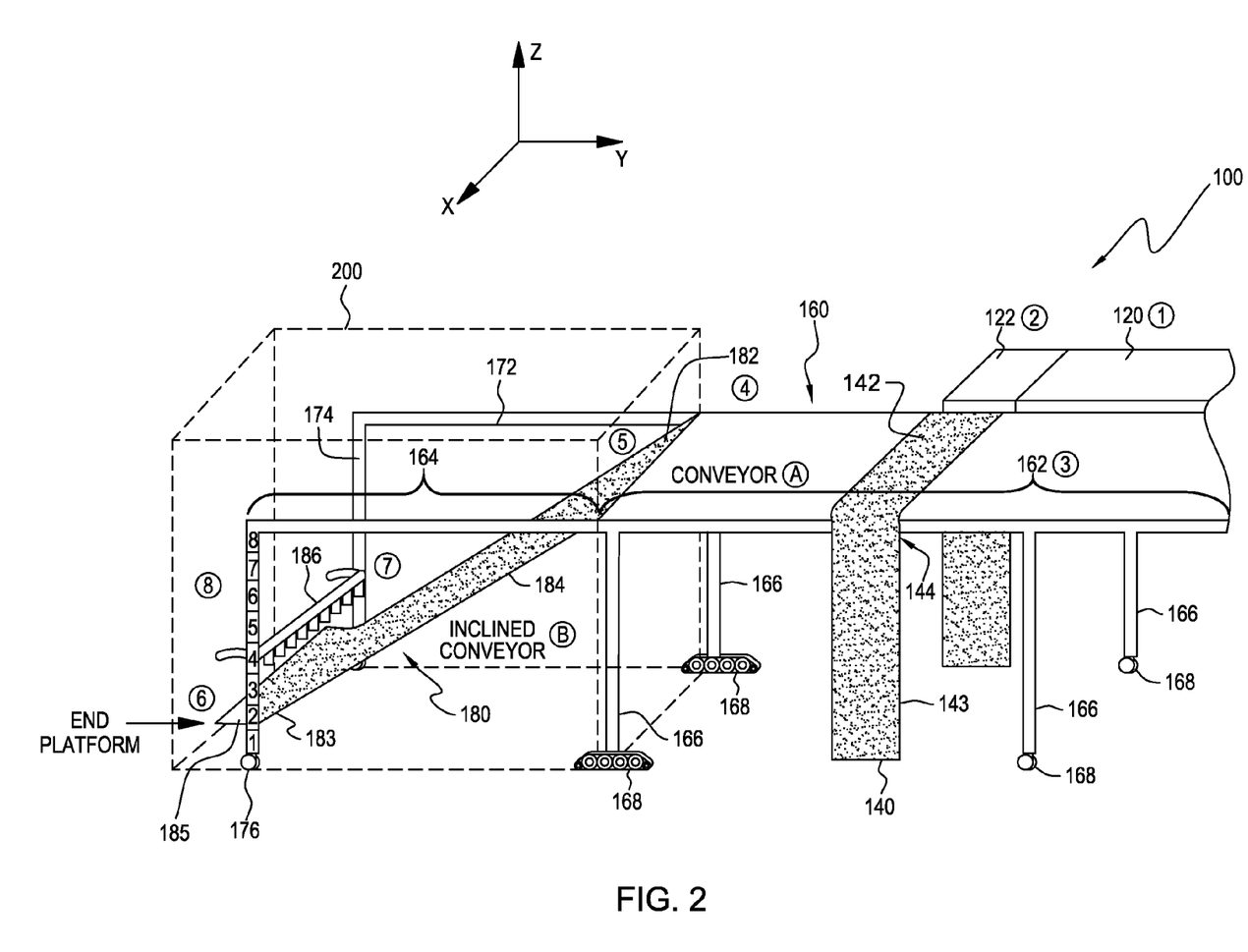
FIG. 2 is a perspective view of the loading and unloading apparatus, illustrating the detailed structures of the apparatus.
Figure 3:
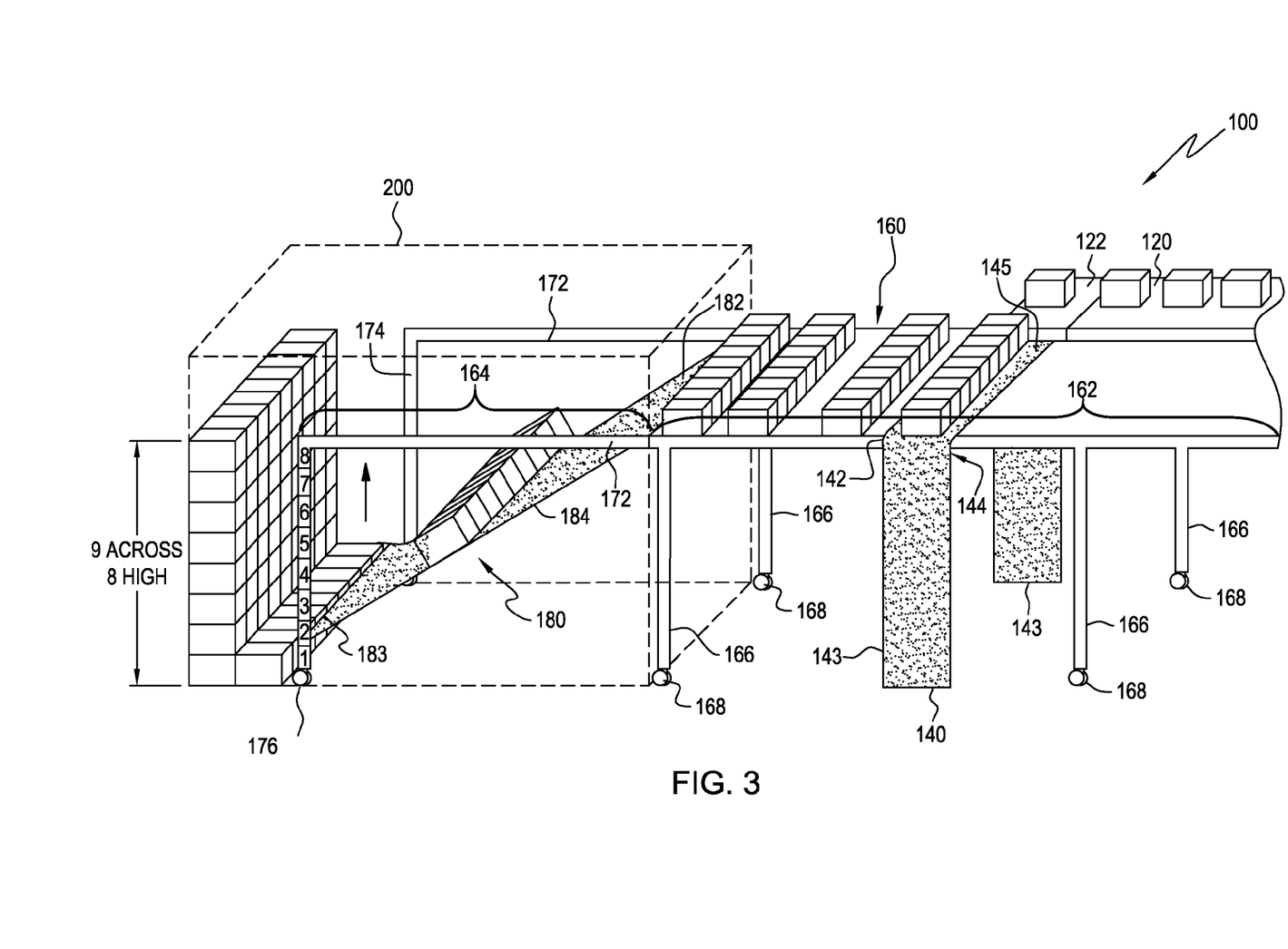
FIG. 3 is another perspective view of the loading and unloading apparatus, illustrating movement of containers along the apparatus.

FIG. 2 and FIG. 3 illustrate detailed structures of the loading and unloading apparatus 100 according to an exemplary embodiment of the present invention.

In FIG. 2, a three-dimensional coordinate system is defined as shown, wherein a lateral direction is defined substantially along the X-axis, a longitudinal direction is defined substantially along the Y-axis and a vertical direction is defined substantially along the Z-axis.

The container preparing unit 120 has a support surface 122, on which a plurality of shipping containers can be numbered and separately transported to the fixed staging unit 140, as shown in FIG. 3. After a preset number of containers are each transported to the fixed staging unit 140 and substantially aligned in a compact row on the support surface 122 of the container preparing unit 120, the row of containers are further transported to the first conveyor 160.

The operation of numbering and aligning the containers can be implemented manually or preferably automatically by any suitable means. In the shown embodiment, the containers are substantially cubical and thus are aligned side-by-side in a row substantially along the lateral direction. However, a person of ordinary skill in the art understands that the plurality of containers can be arranged in any predetermined pattern, depending on the circumstances of applying the loading and unloading apparatus. For example, the containers can be arranged in a square or arranged to have a plurality of layers.

Furthermore, additional mechanism, such as a crane, can be used to assist the arrangement of the containers.

For example, a releasable trigger can be provided to the container preparing unit 120. Release operations of the trigger actuate transportation of each of the preset number of containers onto the fixed staging unit 140 sequentially, thereby providing a compact row of containers on the fixed staging unit 140, as shown in FIG. 3.

The fixed staging unit 140 is designed to be in a permanently fixed position. The fixed staging unit 140 includes a middle section 142 and a pair of legs 143 connected by the middle section 142. The pair of legs 143 are fixedly connected to the ground, and the height of the legs 143 is designed to allow smooth transportation of the containers onto the middle section 142. For example, the legs 143 can be configured to be adjustable to cooperate with container preparing units having different heights.

The middle section 142 defines a hollow space 144 therein for accommodating at least a part of the first conveyor 160. The middle section 142 has an upper surface 145, which can be substantially vertically aligned with the support surface 122 of the container preparing unit 120. The upper surface 145 can be flat, or slightly inclined, to assist moving the compact row of containers onto the first conveyor 160.

The row of containers, having a preset number of containers on the middle section 142 of the fixed staging unit 140, can be moved to the first conveyer 160 manually or preferably automatically. As shown in FIG. 2 and FIG. 3, the first conveyor 160 is configured to receive the row of containers from the fixed staging unit 140 and further transport the containers to the second conveyor 180.

The first conveyor 160 is capable of moving back and forth, substantially horizontally. The first conveyor 160 includes a platform section 162 and a frame section 164, integral or operatively connected with one another. The platform section 162 includes a conveying means for transporting the row of containers from the fixed staging unit 140 to the second conveyor 180. The conveying means includes, but is not limited to, a series of motorized rollers, rotating belt conveyors, non-skid material, rubber, felt, hooks and eyes, and any combination thereof. The platform section 162 can be substantially flat or slightly inclined.

As shown, the platform section 162 further includes two pair of legs 166, each of which is provided with a wheel 168 at the lower end thereof. The middle portion of the platform section 162 passes through the hollow space 144 defined within the middle section 142 of the fixed staging unit 140, which can be realized, for example, during the assembling process of the first conveyor 160. The hollow space 144 and the platform section 162 are dimensioned to allow free translation of the first conveyor 160 under the restrain of the fixed staging unit 140.

The frame section 164 includes a pair of bars 172 projecting substantially horizontally from the platform section 162 and a pair of legs 174 extending downwardly from the bars 172, respectively. Each of the legs 174 is also provided with a wheel 176 at the lower end thereof.

Provision of the wheels 166 and 176 to the platform section 162 and the frame section 164, respectively, assists the first conveyor 160 as well as the second conveyor 180 to move back and forth, thereby selectively accessing the space within the carrier 200.

The second conveyor 180 is inclined with respect to the platform section 162 of the first conveyor 160. The second conveyor 180 includes a first end 182 operatively connected to the platform section 162, a second end 183 which can be moved substantially vertically, and a body 184 connecting the first end 182 and second end 183.

The conveying means of the platform section 162 moves the row of containers from the first conveyor 160 to the first end 182 of the second conveyor 180, upon instructions from the control unit 300. After the containers are completely transferred to the second conveyor 180, the first conveyer 160 stops until triggered to advance another row of containers from the fixed staging unit 140 to the second conveyor 180. The first conveyor 160 will not advance another row of containers onto the second conveyer 180, until the second conveyor has transported the previous row of containers into the carriers 200 and is in a proper position to transport an additional row of containers into the carrier 200.

The second conveyor 180 similarly has a conveying means, which includes, but is not limited to, a series of motorized rollers, rotating belt conveyors, non-skid material, rubber, felt, hooks and eyes, and any combination thereof.

As shown in FIG. 2, the second conveyor 180 includes a substantially horizontal end platform 185 disposed at the second end 183 of the second conveyor 180. The end platform 185 is capable of holding the row of containers after the containers are transported to the second end 183 and moving vertically with the second end 183. Furthermore, the second conveyor 180 can also be moved vertically to a desirable position, prior to placing the containers on the second conveyor 180. Thus, less energy, such as hydraulics, is needed to move the conveyor, absent the additional weight of the containers. The second conveyor 180 further includes arm 186 associated with the platform 185, which moves the containers held by the end platform 185 into the carrier 200, under the instructions of the control unit 300.

For example, the arm 186 can be an arm movable concurrently with the movement of the end platform 185. The arm can pivot or translate to move the container from the platform 185 into the carrier 200. Alternatively, the arm can simply hold the containers as the second conveyor 180 moves back horizontally, to sweep the containers off the end platform 185. Alternatively, the arm can include vacuum heads for engaging and moving the containers. The vacuum heads can be adjustable for selectively moving containers having difference sizes and weights.

The second end 183 and the end platform 185 can be moved vertically to allow rows of containers to be stacked in a column As shown in FIG. 3, after a first row of containers are moved from the end platform 185 into the carrier 200, the second end 183 and the end platform 185 are controlled to move upwardly a distance substantially equal to the height of the containers. At this point, it is considered that the second conveyor 180 is ready for placing another row of containers into the carrier 200 and on top of the first row of containers.

Consequently, instructions are sent to the first conveyor 160 for transporting a second row of containers to the second conveyor 180. As a result of moving the end platform 185 upwardly a distance substantially equal to the height of the containers, the second row of containers is placed by the arm 186 on top of the first row of containers. Subsequently, the end platform 185 moves upwardly again a distance substantially equal to the height of the containers, and the same operations of the first conveyor 160 and the second conveyor 180 repeat to stack the rows of containers in the carrier 200, until a maximum height of the stacked containers in one vertical column is achieved.

Once the maximum height of the stacked containers is achieved, the first conveyor 160 is instructed to move back along the horizontal direction, to start new operations to achieve another vertical column of stacked containers. The backward translation of the first conveyor 160 can be controlled to keep the distance between the vertical columns of stacked containers minimum, so as to utilize the space of the carrier 200 most efficiently.

The operations of the apparatus 100 as described above can be reversed to unload the containers from the carrier 200.

Referring to FIG. 1, the apparatus 100 further includes a user interface 400. The user interface 400 allows a user to communicate with the control unit 300 to enhance and/or expand the functions of the container preparing unit 120, the fixed staging unit 140, the first conveyor 160 and the second conveyor 180, under the control of the control unit 300. For example, a user can input through the user interface 400 instructions and/or parameters for instructing the container preparing unit 120, the fixed staging unit 140, the first conveyor 160 and the second conveyor 180 to perform additional operations.

The control unit 300 can be implemented in a form of a computer, a processor, or a computer readable medium having stored thereon computer executable instructions that, when executed by a processor of a computer, control the processor or computer to perform certain functions.

In the case that a plurality of containers having diverse sizes are to be loaded and unloaded with respect to the carrier 200, the apparatus 100 according to the present invention is capable of providing an optimal loading/unloading sequence to most efficiently utilize the space of the carrier. For example, an identifier, such as a bar code or an RFID tag, can be printed or attached to each container. The identifier contains information indicating sizes and shapes of the containers. This information can be retrieved through suitable known means, and sent together with the dimensional information of the carrier to the control unit 300. The control unit 300 analyzes the information to determine which containers should be placed in the carrier first and which containers should be placed in the carrier subsequently, thereby utilizing the space of the carrier in the most efficient way.

Figure 4:
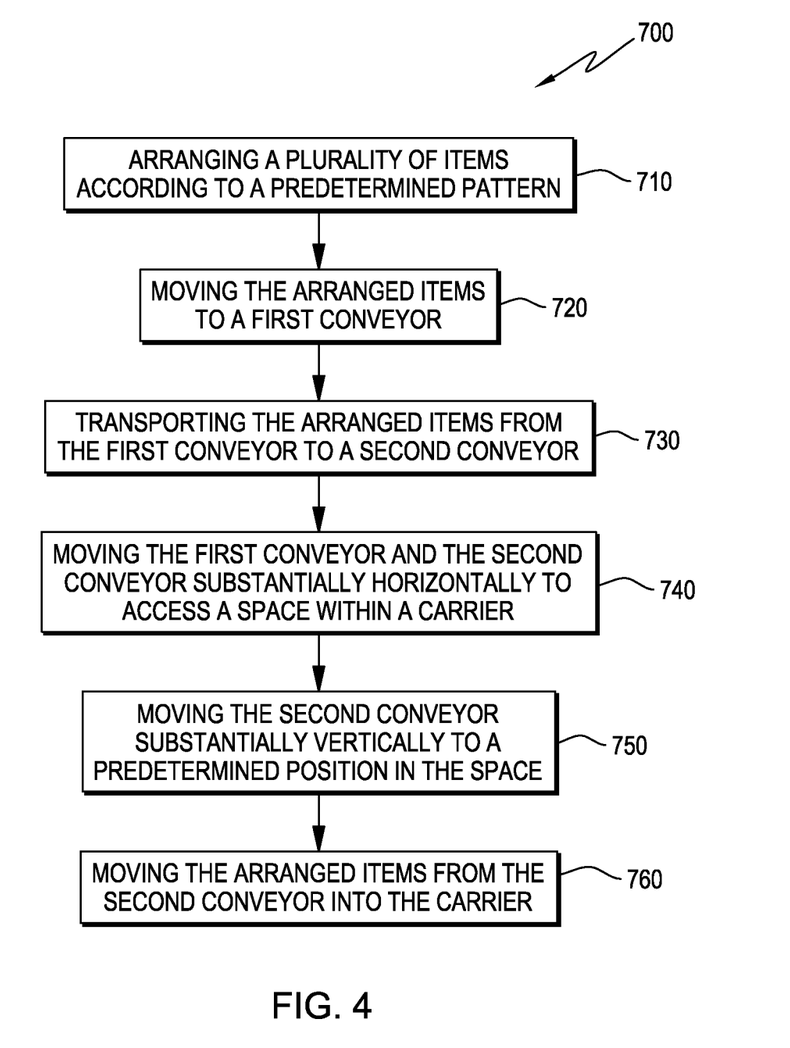
FIG. 4 is a flow chart illustrating a method of loading and unloading a plurality of items according to an exemplary embodiment of another aspect of the present invention.

FIG. 4 is a flow chart illustrating a method 700 for loading and unloading a plurality of items, such as containers, into a carrier, according to an exemplary embodiment of another aspect of the present invention.

At step 710, a plurality of items, such as the containers shown in FIG. 3, are arranged according to a predetermined pattern. For example, the containers can be arranged into a row. The step 710 can be performed on the fixed staging unit 140 of the apparatus 100.

At step 720, the arranged items are moved to a first conveyor, for example, the first conveyor 160 of the apparatus 100. At step 730, the arranged items are transported from the first conveyor to a second conveyor, for example, the second conveyor 180 of the apparatus 100.

At step 740, the first conveyor and the second conveyor are moved substantially horizontally to access a space within the carrier. At step 750, the second conveyor, such as the second end 183 of the second conveyor 180, is moved substantially vertically to a predetermined position in the space. At this step, the position can be determined based on a height of the items, and the items are moved substantially vertically to the position determined based on the height of the items.

At step 760, the arranged items are moved from the second conveyor into the carrier after the second conveyor is vertically moved to the predetermined position.

Figure 5:
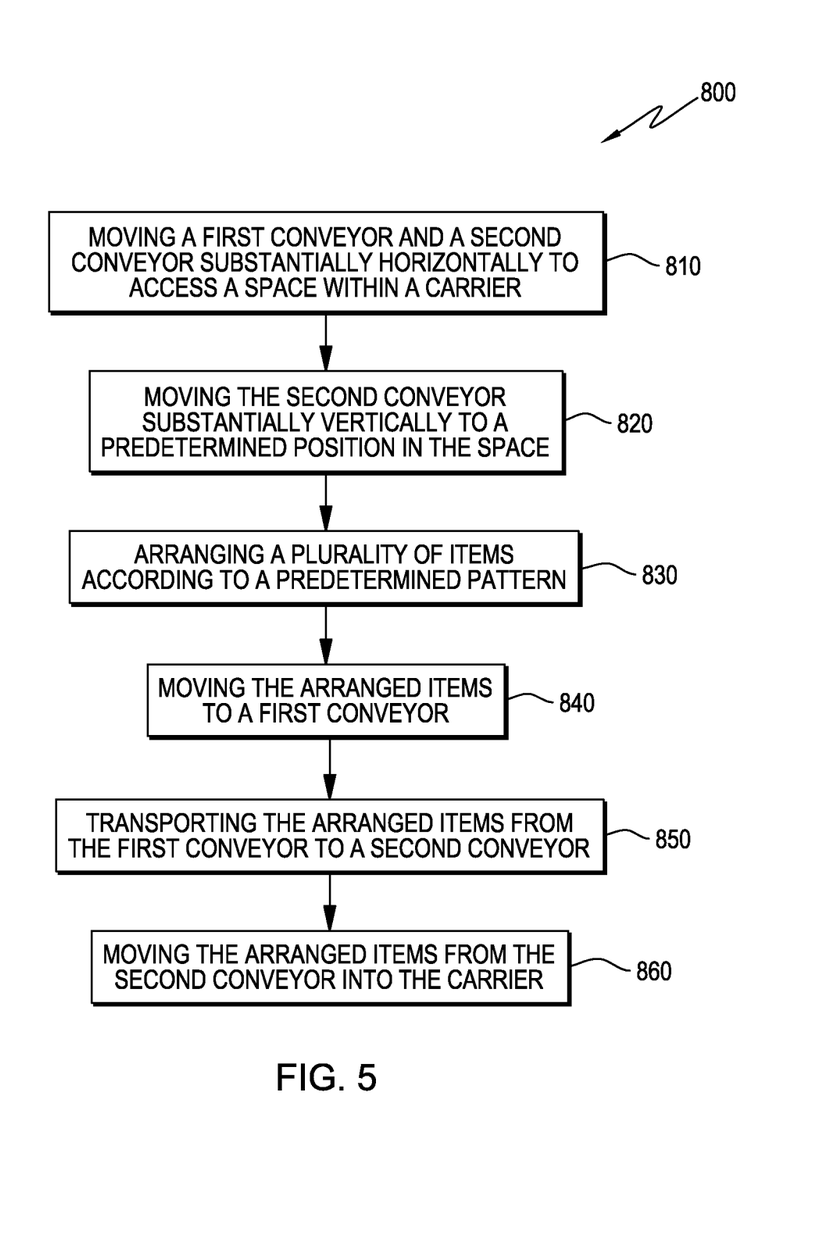
FIG. 5 is a flow chart illustrating a method of loading and unloading a plurality of items according to another exemplary embodiment of the aspect of the present invention.

FIG. 5 is a flow chart illustrating a method 800 for loading and unloading a plurality of items according to another exemplary embodiment of the aspect of the present invention.

At step 810, a first conveyor (for example, the first conveyor 160 of the apparatus 100) and a second conveyor (for example, the second conveyor 180 of the apparatus 100) are moved substantially horizontally to access a space within a carrier, such as the carrier 200. At step 820, the second conveyor is moved substantially vertically to a predetermined position in the space. At this step, the position can be determined based on a height of the items to be conveyed by the conveyors, and the items are moved substantially vertically to the position determined based on the height of the items.

At step 830, a plurality of items, such as the containers shown in FIG. 3, are arranged according to a predetermined pattern. For example, the containers can be arranged into a row. For example, the step 830 can be performed on the fixed staging unit 140 of the apparatus 100.

At step 840, the arranged items are moved to the first conveyor. At step 850, the arranged items are transported from the first conveyor to the second conveyor. At step 860, the arranged items are moved from the second conveyor into the carrier after the second conveyor is vertically moved to the predetermined position.

According to the method 800, the vertical movement of the second conveyor is implemented prior to placing the arranged items onto the second conveyer. Thus, the energy and hydraulics needed to move the conveyor vertically is reduced.

Figure 6:
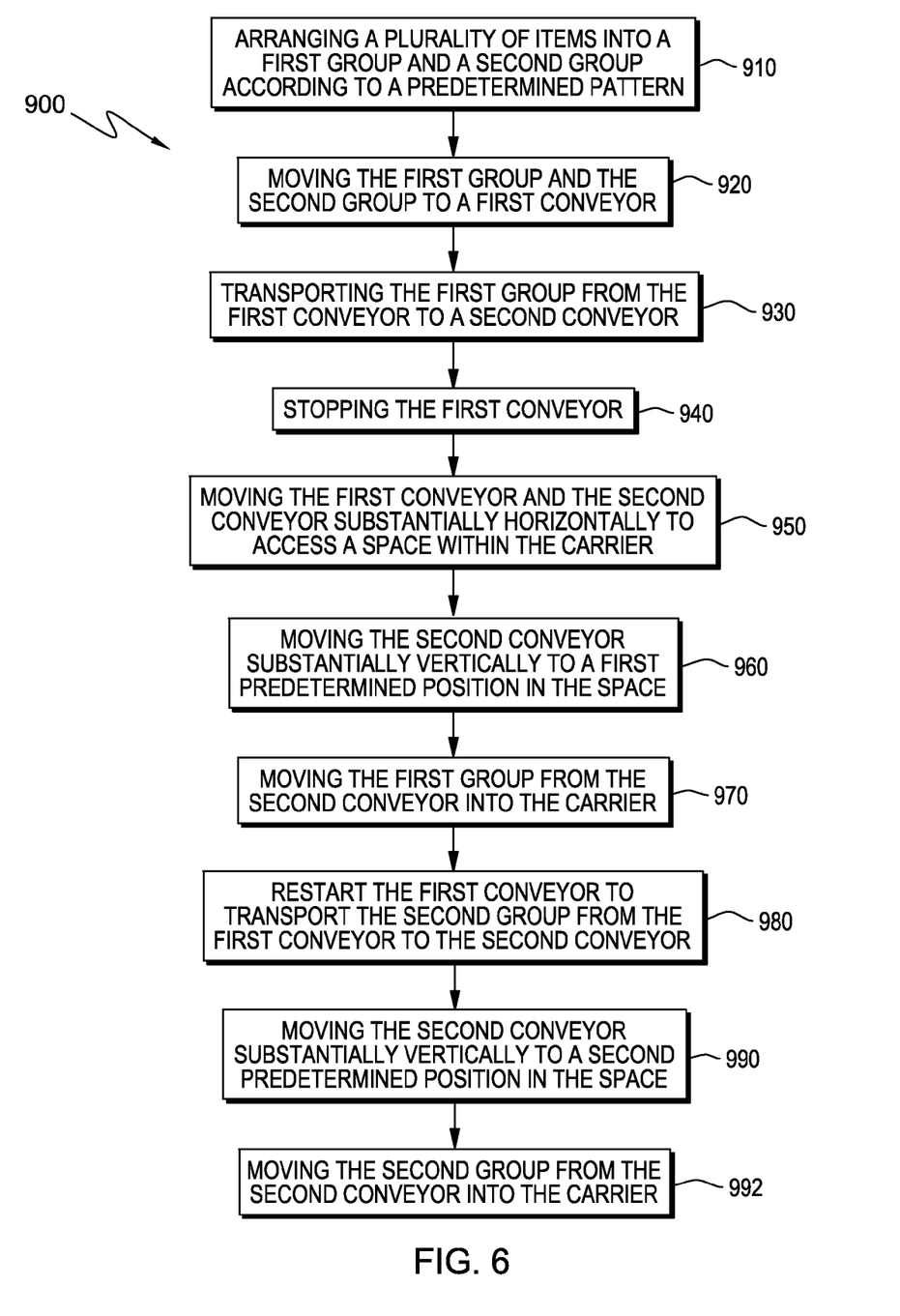
FIG. 6 is a flow chart illustrating a method of loading and unloading a plurality of items according to still another exemplary embodiment of the aspect of the present invention.

FIG. 6 is a flow chart illustrating a method 900 for loading and unloading a plurality of items, such as containers, into a carrier, according to still another exemplary embodiment of the present invention.

At step 910, a plurality of items are arranged into a first group and a second group, according to a predetermined pattern. For example, the items can be arranged into at least a first row and a second row. The step 910 can be performed on the fixed staging unit 140 of the apparatus 100. However, a person of ordinary skill in the art understands that the first group and the second group can be arranged to have different characteristics. For example, the first group can be a row and the second group can be a column.

At step 920, the first group and the second group are moved to a first conveyor, for example, the first conveyor 160 of the apparatus 100. At step 930, the first group is transported from the first conveyor to a second conveyor, for example, the second conveyor 180 of the apparatus 100. Subsequently, at step 940, the first conveyor is stopped.

At step 950, the first conveyor and the second conveyor are moved substantially horizontally to access a space within the carrier. At step 960, the second conveyor is moved substantially vertically to a first predetermined position in the space. Depending on the circumstances, moving the second conveyor substantially vertically to a first predetermined position in the space includes keeping or moving the second conveyor to the ground.

At step 970, the first group is moved from the second conveyor into the carrier. At step 980, the first conveyor is restarted to transport the second group from the first conveyor to the second conveyor.

At step 990, the second conveyor is moved substantially vertically to a second predetermined position in the space. This step includes determining the second position based on a height of the containers and the first predetermined potion, and moving the second conveyor substantially vertically to the second position. At step 992, the second group is moved from the second conveyor into the carrier.

The method can further include moving the first conveyor and the second conveyor substantially horizontally after transporting the second group from the first conveyor to the second conveyor.

The method can further include moving the first conveyor and the second conveyor substantially horizontally after transporting the second group from the second conveyor into the carrier. For example, after the first row and the second row of containers are stacked into the carrier. The conveyors can be moved horizontally to allow forming another stack of containers in the carrier.

Figure 7:
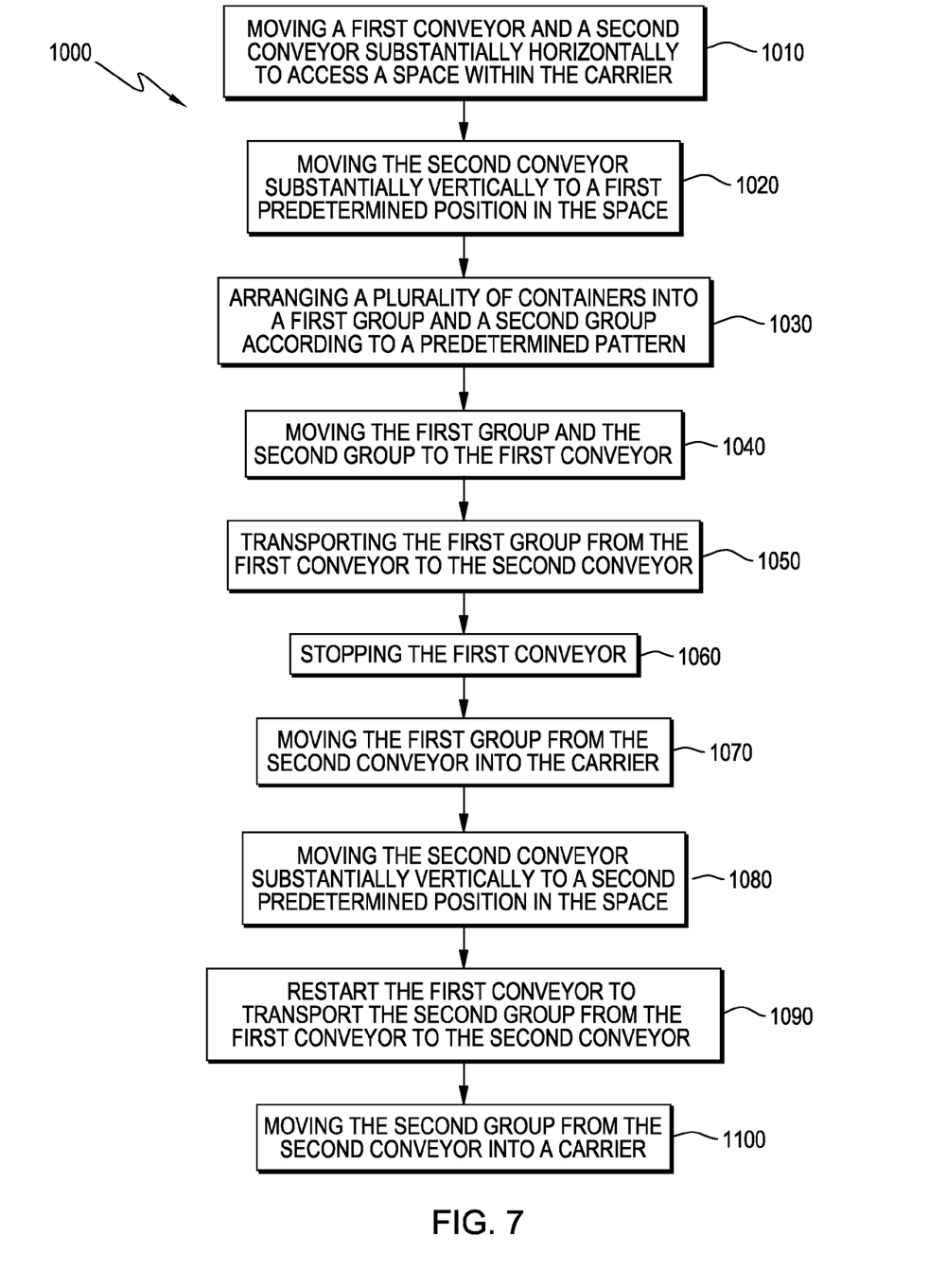
FIG. 7 is a flow chart illustrating a method of loading and unloading a plurality of items according to yet another exemplary embodiment of the aspect of the present invention.

FIG. 7 is a flow chart illustrating a method 1000 for loading and unloading a plurality of items, such as containers, into a carrier, according to yet another exemplary embodiment of the present invention.

At step 1010, a first conveyor and a second conveyor are moved substantially horizontally to access a space within a carrier. At step 1020, the second conveyor is moved substantially vertically to a first predetermined position in the space. Depending on the circumstances, moving the second conveyor substantially vertically to a first predetermined position in the space includes keeping or moving the second conveyor to the ground.

At step 1030, a plurality of items are arranged into a first group and a second group, according to a predetermined pattern. For example, the items can be arranged into at least a first row and a second row. However, a person of ordinary skill in the art understands that the first group and the second group can be arranged to have different characteristics. For example, the first group can be a row and the second group can be a column.

At step 1040, the first group and the second group are moved to the first conveyor. At step 1050, the first group is transported from the first conveyor to the second conveyor. Subsequently, at step 1060, the first conveyor is stopped. At step 1070, the first group is moved from the second conveyor into the carrier.

At step 1080, the second conveyor is moved substantially vertically to a second predetermined position in the space. This step includes determining the second position based on a height of the items and the first predetermined potion, and moving the second conveyor substantially vertically to the second position. At step 1090, the first conveyor is restarted to transport the second group from the first conveyor to the second conveyor. At step 1100, the second group is moved from the second conveyor into the carrier.

According to the method 1000, the vertical movement of the second conveyor is implemented prior to placing the first group and the second group onto the second conveyer. Thus, the energy and hydraulics needed to move the conveyor vertically is reduced.

The method can further include moving the first conveyor and the second conveyor substantially horizontally after transporting the second group from the first conveyor to the second conveyor.

The method can further include moving the first conveyor and the second conveyor substantially horizontally after transporting the second group from the second conveyor into the carrier. For example, after the first row and the second row of containers are stacked into the carrier. The conveyors can be moved horizontally to allow forming another stack of containers in the carrier.

The loading and unloading apparatus and method according to the exemplary embodiments of the present invention are capable of automatically loading and unloading shipping containers with respect to, for example, a shipping trailer with minimum human intervention. Thus, the loading and unloading efficiency is improved. Furthermore, by configuring the control unit, the loading and unloading apparatus is capable of determining an optimal sequence for loading the containers into the carrier. Thus, the limited space of the carrier can be utilized most efficiently.

Although the loading and unloading apparatus and method according to the present invention has been described with respect to loading and unloading containers commonly used for shipping purpose, a person of ordinary skill in the art understands that the apparatus and method according to the present invention can be used to load and unload a wide variety of items, articles and objects.

The features of the present invention as applied to various specific embodiments thereof have been shown and described. It will also be understood that various omissions, substitutions and changes in the form and details of the devices illustrated and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for loading a plurality of items into a carrier, comprising:
   a fixed staging unit, on which the plurality of items are arranged according to a predetermined pattern;
   a first conveyor configured to receive and transport the arranged items from the fixed staging unit, the first conveyor being movable substantially horizontally;
   a second conveyor operatively connected to the first conveyor, the second conveyor being configured to receive the arranged items from the first conveyor and transport the arranged items into the carrier, the second conveyor being movable substantially horizontally and vertically; and
   a control unit configured to control transportation of the arranged items from the second conveyor into the carrier when the second conveyor is vertically moved to a predetermined position.

2. The apparatus according to claim 1, wherein the second conveyor comprises a first end operatively connected to the first conveyor, a second end movable substantially vertically, and a body connecting the first end and the second end.

3. The apparatus according to claim 2, wherein the second conveyor comprises a platform disposed at the second end thereof, for holding and substantially vertically moving the arranged items.

4. The apparatus according to claim 3, wherein the second conveyor comprises an arm associated with the platform, for moving the arranged items from the platform into the carrier.

5. The apparatus according to claim 4, wherein the control unit is configured to move the end platform vertically to the predetermined position based on a height of the items.

6. The apparatus according to claim 1, wherein the fixed staging unit comprises a middle section and at least a pair of legs connected by the middle section, the middle section defining a hollow space therein.

7. The apparatus according to claim 6, wherein the first conveyor comprises a platform section and a frame section, at least a portion of the platform section being received in the hollow space of the middle section of the fixed staging unit.

8. The apparatus according to claim 7, wherein the first conveyor comprises a plurality of wheels for assisting the substantially horizontal movement of the first conveyor.

9. A method of loading a plurality of items into a carrier, comprising:
   arranging the plurality of items according to a predetermined pattern;
   moving the arranged items to a first conveyor;
   transporting the arranged items from the first conveyor to a second conveyor;
   moving the first conveyor and the second conveyor substantially horizontally to access a space within the carrier;
   moving the second conveyor substantially vertically to a predetermined position in the space; and
   moving the arranged items from the second conveyor into the carrier.

10. The method according to claim 9, wherein the step of arranging comprises arranging the plurality of items into a row.

11. The method according to claim 9, wherein the step of moving the second conveyor substantially vertically comprises determining a position in the space based on a height of the items and moving the second conveyor substantially vertically to the position.

12. The method according to claim 9, wherein the steps of moving the first conveyor and the second conveyor substantially horizontally to access a space within the carrier and moving the second conveyor substantially vertically to a predetermined position in the space are performed prior to the step of arranging the plurality of items according to a predetermined pattern.

13. A method of loading a plurality of items into a carrier, comprising:
   arranging the plurality of items into a first group and a second group according to a predetermined pattern;
   moving the first group and the second group to a first conveyor;
   transporting the first group from the first conveyor to a second conveyor;
   stopping the first conveyor;
   moving the first conveyor and the second conveyor substantially horizontally to access a space within the carrier;
   moving the second conveyor substantially vertically to a first predetermined position in the space;
   moving the first group from the second conveyor into the carrier;
   restarting the first conveyor to transport the second group from the first conveyor to the second conveyor;
   moving the second conveyor substantially vertically to a second predetermined position in the space; and
   moving the second group from the second conveyor into the carrier.

14. The method according to claim 13, wherein the step of arranging the plurality of items into a first group and a second group according to a predetermined pattern comprises arranging the plurality of items into at least a first row and a second row.

15. The method according to claim 13, wherein the step of moving the second conveyor substantially vertically to a second predetermined position in the space comprises determining the second position based on a height of the items and the first predetermined potion, and moving the second conveyor substantially vertically to the second position.

16. The method according to claim 13, further comprising moving the first conveyor and the second conveyor substantially horizontally after transporting the second group from the first conveyor to the second conveyor.

17. The method according to claim 13, further comprising moving the first conveyor and the second conveyor substantially horizontally after moving the second group from the second conveyor into the carrier.

18. The method according to claim 13, wherein the steps of moving the first conveyor and the second conveyor substantially horizontally to access a space within the carrier and moving the second conveyor substantially vertically to a first predetermined position in the space are performed prior to the step of arranging the plurality of items into a first group and a second group according to a predetermined pattern.

19. The method of claim 18, wherein the step of moving the second conveyor substantially vertically to a second predetermined position in the space is performed prior to the step of restarting the first conveyor to transport the second group from the first conveyor to the second conveyor.

* * * * *